(12) United States Patent
Lundberg et al.

(10) Patent No.: US 11,610,461 B2
(45) Date of Patent: Mar. 21, 2023

(54) VIDEO COMPRESSION STREAM

(71) Applicant: Axis AB, Lund (SE)

(72) Inventors: Stefan Lundberg, Lund (SE); Song Yuan, Lund (SE); Tim Borglund, Lund (SE)

(73) Assignee: AXIS AB, Lund (SE)

(*) Notice: Subject to any disclaimer, the term of this patent is extended or adjusted under 35 U.S.C. 154(b) by 190 days.

(21) Appl. No.: 17/242,324

(22) Filed: Apr. 28, 2021

(65) Prior Publication Data

US 2021/0358088 A1 Nov. 18, 2021

(30) Foreign Application Priority Data

May 12, 2020 (EP) .................................... 20174131

(51) Int. Cl.
*G08B 13/196* (2006.01)
*H04N 5/232* (2006.01)
*G06T 5/00* (2006.01)

(52) U.S. Cl.
CPC ... *G08B 13/19667* (2013.01); *H04N 5/23229* (2013.01); *G06T 5/002* (2013.01); *G06T 2207/10016* (2013.01)

(58) Field of Classification Search
None
See application file for complete search history.

(56) References Cited

U.S. PATENT DOCUMENTS

| 2007/0286520 A1 | 12/2007 | Zhang et al. |
| 2014/0211045 A1* | 7/2014 | Tanaka ................. G06V 40/168 348/239 |
| 2015/0310297 A1* | 10/2015 | Li ............................ G06T 7/11 382/199 |

FOREIGN PATENT DOCUMENTS

| EP | 3 182 711 A1 | 6/2017 |
| EP | 3 425 590 A1 | 1/2019 |

OTHER PUBLICATIONS

Extended European Search Report received for European Patent Application No. 20174131.1, dated Oct. 23, 2020, 9 pages.

* cited by examiner

*Primary Examiner* — Quan Pham
(74) *Attorney, Agent, or Firm* — Xsensus LLP (57) ABSTRACT

The present disclosure relates to a method performed by a background blurring system (1) for provision of a video compression stream from a video camera (2) adapted for capturing a scene. The background blurring system identifies (1001) in a first image of the scene, at a first point in time, at least a first pixel comprised in a background of the first image. The background blurring system further determines (1002) a blurred pixel value for the at least first pixel. Moreover, the background blurring system provides (1003), subsequent the first point in time, the blurred pixel value in the video compression stream. The background blurring system furthermore identifies (1004) in a second image of the scene, at a subsequent second point in time, that the at least first pixel has altered to be comprised in a foreground of the second image. Moreover, the background blurring system provides (1005) in the video compression stream,

(Continued)

subsequent the second point in time—continuously and/or intermittently—identified non-blurred pixel values for the at least first pixel. The background blurring system further identifies (1006) in a third image of the scene, at a subsequent third point in time, that the at least first pixel has altered to be comprised in a background of the third image, wherein a value of the at least first pixel has remained unchanged from an intermediate point in time up to the third point in time. Furthermore, when the third point in time is within a predeterminable background merge time period from the intermediate point in time, the background blurring system provides (1007), subsequent the third point in time, the blurred pixel value in the video compression stream.

The disclosure also relates to a background blurring system in accordance with the foregoing, a video camera comprising such a background blurring system, and a respective corresponding computer program product and non-volatile computer readable storage medium.

15 Claims, 3 Drawing Sheets

VIDEO COMPRESSION STREAM

CROSS-REFERENCE TO RELATED APPLICATION

The present application is based on and claims priority to European Patent Application No. EP 20174131.1 filed on May 12, 2020, the entire contents of which being incorporated herein by reference.

TECHNICAL FIELD

The present disclosure relates to provision of a video compression stream from a video camera adapted for capturing a scene.

BACKGROUND

With the use of video cameras—for instance for surveillance purposes—it may be possible to see what is happening in specific surroundings, such as in an office, an industrial site, a part of a city, an open square, a city block, a road etc., as it is happening and/or at a later occasion. The video streams of the surroundings i.e. scenes, may assist in providing insights and information related to said scenes, which may be revealing and/or of interest in one way or another. Providing video steams—such as e.g. live video streams—from video cameras, however, commonly come at a high computational cost, and may further require high amounts of bitrate. It is thus known to compress such video streams with various known techniques. It is further known to blur background portions thereof to render them indistinct, such that one or more persons and/or objects in the foreground may be kept in focus, while the background may appear to be out of focus. However, although background blurring—in addition to potentially being efficient in terms of privacy concerns—may lead to lowered bitrate consumption, decreasing computational cost and/or bitrate in video streams, remains a challenge.

SUMMARY OF THE INVENTION

It is therefore an object of embodiments herein to provide an approach for in an improved and/or alternative manner providing a video compression stream, such as a video compression stream from a video camera adapted for capturing a scene.

The object above may be achieved by the subject-matter disclosed herein. Embodiments are set forth in the appended claims, in the following description and in the drawings.

The disclosed subject-matter relates to a method performed by a background blurring system for provision of a video compression stream from a video camera adapted for capturing a scene. The background blurring system identifies—in a first image of the scene—at a first point in time, at least a first pixel comprised in a background of the first image. The background blurring system further determines a blurred pixel value for the at least first pixel. Moreover, the background blurring system provides—subsequent the first point in time—the blurred pixel value in the video compression stream. The background blurring system furthermore identifies in a second image of the scene—at a subsequent second point in time—that the at least first pixel has altered to be comprised in a foreground of the second image. Moreover, the background blurring system provides in the video compression stream, subsequent the second point in time—continuously and/or intermittently—identified non-blurred pixel values for the at least first pixel. The background blurring system further identifies—in a third image of the scene—at a subsequent third point in time, that the at least first pixel has altered to be comprised in a background of the third image, wherein a value of the at least first pixel has remained unchanged from an intermediate point in time up to the third point in time. Furthermore, when the third point in time is within a predeterminable background merge time period from the intermediate point in time, the background blurring system provides—subsequent the third point in time—the blurred pixel value in the video compression stream.

The disclosed subject-matter further relates to a background blurring system for provision of a video compression stream from a video camera adapted for capturing a scene. The background blurring system comprises a first identifying unit for—and/or adapted for—identifying, in a first image of the scene—at a first point in time—at least a first pixel comprised in a background of the first image. The background blurring system further comprises a first blurring unit for—and/or adapted for—determining a blurred pixel value for the at least first pixel. Moreover, the background blurring system comprises a first providing unit for—and/or adapted for—providing, subsequent the first point in time, the blurred pixel value in the video compression stream. The background blurring system further comprises a second identifying unit for—and/or adapted for—identifying in a second image of the scene, at a subsequent second point in time, that the at least first pixel has altered to be comprised in a foreground of the second image. Moreover, the background blurring system comprises a second providing unit for—and/or adapted for—providing in the video compression stream, subsequent the second point in time—continuously and/or intermittently—identified non-blurred pixel values for the at least first pixel. The background blurring system furthermore comprises a third identifying unit for—and/or adapted for—identifying in a third image of the scene, at a subsequent third point in time, that the at least first pixel has altered to be comprised in a background of the third image, wherein a value of the at least first pixel has remained unchanged from an intermediate point in time up to the third point in time. Moreover, the background blurring system comprises a third providing unit for—and/or adapted for—when the third point in time is within a predeterminable background merge time period from the intermediate point in time, providing—subsequent the third point in time—the blurred pixel value in the video compression stream.

Furthermore, the disclosed subject-matter relates to a video camera comprising a background blurring system as described herein.

Moreover, the disclosed subject-matter relates to a computer program product comprising a computer program containing computer program code means arranged to cause a computer or a processor to execute the steps of the background blurring system described herein, stored on a computer-readable medium or a carrier wave.

The disclosed subject-matter further relates to a non-volatile computer readable storage medium having stored thereon said computer program product.

Thereby, there is introduced an approach according to which compute-efficient and/or bitrate-efficient background blurring is enabled. That is, since there is identified in a first image of a scene captured by a video camera, at a first point in time, at least a first pixel comprised in a background of the first image, it is established one or more pixels that are deemed to belong to a background region of said captured image of the scene, at said time point, for instance as a result of the scene comprising static and/or non-moving persons and/or objects. Furthermore, that is, since there is determined a blurred pixel value for the at least first pixel, a blurred value may be established for the at least first identified background pixel, which subsequently may render said pixel to be perceived as blurred, unfocused and/or indistinct. Moreover, that is, since the blurred pixel value subsequent the first point in time is provided in the video compression stream, the determined blurred pixel value for the at least first pixel relevant for the first captured image, is utilized for the video compression stream. Accordingly, by utilizing blurred pixel values for the one or more identified background pixels in the video compression stream rather than un-blurred pixel values, bitrate may be decreased, and/or privacy concerns met. Moreover, in that background pixels then may be blurred as opposed to un-blurred foreground pixels, objects comprising foreground pixels—such as for instance a moving person and/or object—may be in focus and/or appear highlighted as compared to a non-moving person and/or object comprising background pixels. Furthermore, that is, since there is identified in a second image of the scene, at a subsequent second point in time, that the at least first pixel has altered to be comprised in a foreground of the second image, it is established that the one or more pixels previously identified as belonging to a background, in a second image of the scene occurring at an arbitrary second time point are deemed to have altered to belong to a foreground region of the captured second image, for instance as a result of one or more persons and/or objects entering the scene. Moreover, that is, since identified non-blurred pixel values for the at least first pixel subsequent the second point in time—continuously and/or intermittently—are provided in the video compression stream, an identified pixel value for the at least first pixel relevant for the second captured image—and further identified changing pixel values thereof in an arbitrary number of subsequent captured images of the scene—are utilized for the video compression stream. Accordingly, by utilizing non-blurred pixel values—continuously and/or intermittently updated—for the one or more identified foreground pixels in the video compression stream, foreground pixels—such as e.g. one or more moving persons and/or objects—may be in focus as compared to blurred background pixels. Furthermore, that is, since there is identified in a third image of the scene, at a subsequent third point in time, that the at least first pixel has altered to be comprised in a background of the third image, wherein a value of the at least first pixel has remained unchanged from an intermediate point in time up to the third point in time, it is established that the one or more pixels previously identified as belonging to a background followed by being identified as belonging to a foreground, in a third image of the scene occurring at an arbitrary third time point are deemed to have once again—after having been unchanged since an intermediate time point—altered to belong to a background region, for instance as a result of one or more persons and/or objects having left the scene and/or being at least partly still. Moreover, that is, since subsequent the third point in time—when the third point in time is within a predeterminable background merge time period from the intermediate point in time—the blurred pixel value is provided in the video compression stream, following said third time point, if the time range from the intermediate time point—i.e. when the at least first pixel last changed its pixel value—to the third time point—i.e. when the at least first pixel altered from being a foreground pixel to again become a background pixel—is within a set time period, then the previously determined blurred pixel value for the at least first pixel is re-used in the video compression stream. That is, if the at least first pixel alters from a non-changing foreground pixel to then once again become a background pixel within a predeterminable time period—which for instance may be exemplified by one or more persons and/or objects passing through the scene within said background merge time period e.g. set to exemplifying five second and/or never standing still for more than the background merge time period—then the already determined blurred pixel value—which was determined following the first time point i.e. when the at least first pixel was previously identified as a background pixel—is again used in the video compression stream. Thus, by re-using the already determined blurred pixel value—which may be considered still valid when the background merge time period criterion is met—it is deemed unnecessary to determine an updated blurred pixel value for the at least first pixel, and accordingly, reduced computational cost and/or efficient bitrate compression of the video compression stream is provided.

For that reason, an approach is introduced for in an improved and/or alternative manner providing a video compression stream, such as a video compression stream from a video camera adapted for capturing a scene The technical features and corresponding advantages of the above mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to provision of a video compression stream from a video camera adapted for capturing a scene, there will be disclosed an approach according to which compute-efficient and/or bitrate-efficient background blurring is enabled.

Figure 1A:
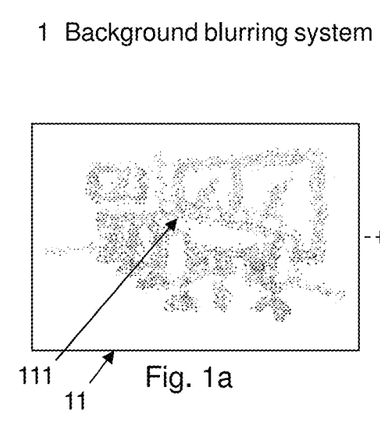
FIGS. 1a-e illustrate schematic views of exemplifying video compression stream images provided from an exemplifying background blurring system according to embodiments of the disclosure.
Figure 1B:
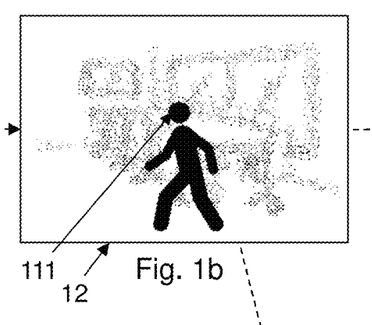
Figure 1C:
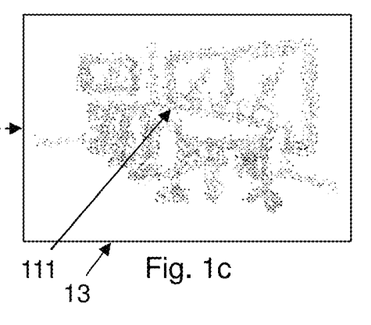
Figure 1D:
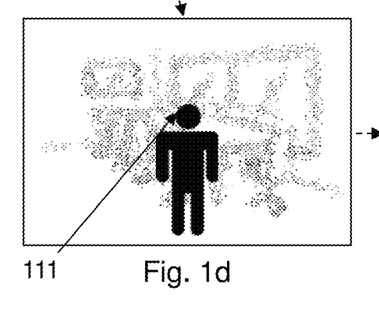
Figure 1E:
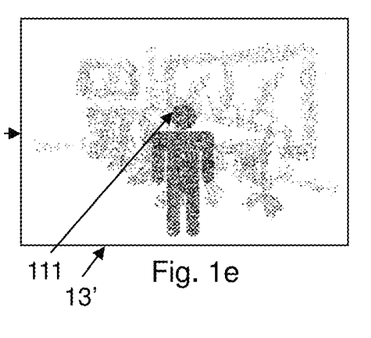
Figure 2:
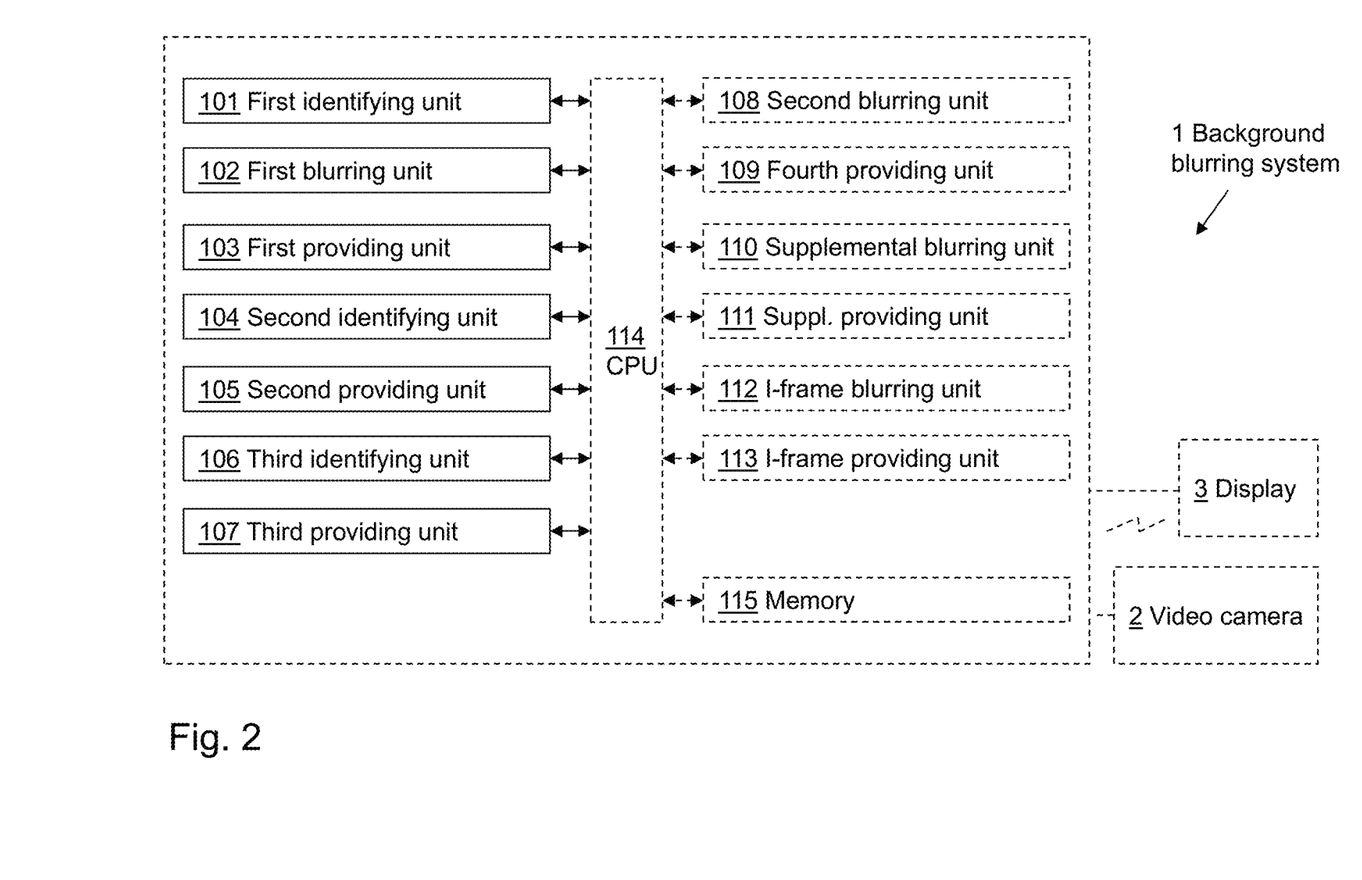
FIG. 2 is a schematic block diagram illustrating an exemplifying background blurring system according to embodiments of the disclosure.

Referring now to the figures and FIGS. 1-2 in particular, there are depicted in FIGS. 1a-e schematic views of exemplifying video compression stream images provided from an exemplifying background blurring system 1 according to embodiments of the disclosure, and in FIG. 2, a schematic block diagram illustrating an exemplifying background blurring system 1 according to embodiments of the disclosure. The background blurring system 1 is adapted and/or configured for provision of a video compression stream from a video camera 2 adapted for capturing a scene.

The video camera 2 may refer to any arbitrary—e.g. known—video camera adapted for image capturing. Said video camera 2 may further, according to an example, be comprised in a video camera arrangement and/or network (not shown) comprising additional components, for instance being part of an exemplifying surveillance system (not shown). The scene which the video camera 2 is adapted to capture may be represented by any arbitrary scene, such as an office, an industrial site, a part of a city, an open square, a city block, a road etc. Said scene may further optionally be a scene of interest for surveillance. Moreover, the video camera 2 may be arranged to be relatively close to potential one or more e.g. persons and/or objects of the scene, to enable said object(s) and/or person(s) to make up a relatively large portion of a captured image of said scene. The background blurring system 1 may be comprised in said video camera 2; alternatively, the background blurring system 1 may for instance be provided at least partly outside the video camera 2, such as in the exemplifying video camera arrangement or surveillance system, and/or in one or more servers. Moreover, the video camera 2 and/or the background blurring system 1 may comprise components supporting pixel blurring. The video compression stream to be provided may be of any arbitrary feasible size and/or length, and further of any arbitrary feasible format given the restrictions of the features provided herein. The phrase "background blurring system" may refer to "processing system", "compression system" and/or "video stream background blurring system", whereas "for provision of a video compression stream" may refer to "for providing, producing, generating, displaying, storing and/or saving a video compression stream", "for background blurring processing of a video stream" and/or "for processing of a video stream". The phrase "video compression stream", on the other hand, may throughout the disclosure refer to "compressed video stream" and/or "compressed video signals", and according to an example further to "video compression live stream". Moreover, "video camera adapted for capturing a scene" may refer to "video camera adapted for capturing a surrounding" and according to an example further to "surveillance video camera adapted for capturing a scene" and/or "video camera adapted for capturing a scene for surveillance".

The background blurring system 1 is—e.g. by means of a first identifying unit 101—adapted and/or configured for identifying in a first image of the scene, at a first point in time, at least a first pixel comprised in a background of the first image. Thereby, it is established one or more pixels that are deemed to belong to a background region of said captured image of the scene, at said time point. According to an example, the one or more pixels being considered to be background pixels may for instance result from the scene comprising static and/or non-moving persons and/or objects. It may be noted that such e.g. persons and/or objects constituting background pixels not necessarily need to be positioned further away from the video camera 2 than persons and/or objects constituting foreground pixels, they may just as well be positioned closer to the video camera 2 than said persons and/or objects constituting foreground pixels.

The first image may refer to any arbitrary image of the scene captured by the video camera 2, and in a similar manner, the first point in time may refer to any arbitrary time point. Similarly, the at least first pixel may refer to any arbitrary one or more pixels in the first image, located at any arbitrary location(s) in said image. Moreover, coming to the conclusion that the at least first pixel is comprised in a background of the first image may be determined—and/or have been determined—in any arbitrary—e.g. known—feasible manner, such as by detection of non-changing pixel value and/or pixel intensity e.g. to a predeterminable extent, and/or by commonly known image depth detection, e.g. with support from IR imaging of the scene and/or depth camera(s). That is, pixels of an image may be regarded as either foreground or background pixels, where—according to an example—foreground pixels may indicate pixels that are—and/or have values that are—dynamic and/or changing, whereas background pixels may indicate pixels that are—and/or have values that are—e.g. to a predeterminable, static and/or non-changing. The term "identifying" in an image may throughout the disclosure refer to "detecting, filtering out and/or determining" in an image, whereas "in a [ . . . ] image" throughout may refer to "in a [ . . . ] captured image" and/or "in a [ . . . ] image captured by said video camera". The phrase "at least a first pixel", on the other hand, may refer to "one or more pixels" and/or "one or more adjacent and/or distributed pixels", whereas "pixel comprised in a background" may refer to "pixel deemed and/or determined to be comprised in a background", "pixel comprised in a determined background", "pixel belonging to a background" and/or "pixel comprised in a background region". According to an example, the phrase "pixel comprised in a background of [ . . . ] image" may throughout the disclosure refer to "pixel comprised in a static and/or non-changing region of [ . . . ] image" and/or "pixel determined and/or deemed to be—and/or having a value that is—static and/or non-changing and/or having been static and/or non-changing to a predeterminable extent".

The background blurring system 1 is—e.g. by means of a first blurring unit 102—adapted and/or configured for determining a blurred pixel value for the at least first pixel. Thereby, a blurred value may be established for the at least first identified background pixel, which subsequently may render said pixel to be perceived as blurred, unfocused and/or indistinct.

Determining a blurred pixel value for the one or more identified background pixels may be accomplished in any arbitrary—e.g. known—feasible manner, e.g. with support from one or more commonly known image filter kernels e.g. blur kernels. Such an exemplifying image filter kernel may be of any arbitrary feasible dimensions and/or size, and for instance refer to a square kernel such as a 3*3 kernel, a 11*11 kernel, a 21*21 kernel etc., and/or a non-square kernel such as a e.g. a 21*11 kernel, where 21 may be horizontally arranged. The extent to which the at least first pixel is blurred may be arbitrarily selected, e.g. as deemed suitable for the implementation at hand. Optionally, for bitrate efficiency, a kernel size of an image filter kernel used for determining blurred pixel values of the at least first pixel, may align with a macro block size of an I-frame of the video compression stream. The phrase "determining" blurred pixel value(s) may throughout the disclosure refer to "applying" blurred pixel value(s) and/or "calculating" blurred pixel value(s), and according to an example further to "determining based on an image filter kernel" blurred pixel value(s). The phrase "blurred pixel value", on the other hand, may throughout refer to "unfocused and/or indistinct pixel value", whereas "for the at least first pixel" may refer to "applicable for the at least first pixel". According to an example, "blurred pixel value" may additionally or alternatively refer to "color removed pixel value". Moreover, according to an example, "blurred" may throughout the disclosure refer to "blurred and/or modified" or merely "modified", whereby a "modified' pixel value then may have been modified in any arbitrary feasible manner.

The background blurring system 1 is—e.g. by means of a first providing unit 103—adapted and/or configured for providing, subsequent the first point in time, the blurred pixel value in the video compression stream. Thereby, the determined blurred pixel value for the at least first pixel relevant for the first captured image, is utilized for the video compression stream, such as—as illustrated in FIG. 1*a*—for a corresponding at least first stream pixel 111 displayed in a corresponding first compressed image 11 of said stream. Accordingly, by utilizing blurred pixel values for the one or more identified background pixels in the video compression stream rather than un-blurred pixel values, bitrate may be decreased, and/or privacy concerns met. Moreover, in that background pixels then may be blurred as opposed to un-blurred foreground pixels, objects comprising foreground pixels—such as for instance a moving person and/or object—may be in focus and/or appear highlighted as compared to a non-moving person and/or object comprising background pixels. In exemplifying FIG. 1*a*, all pixels—including the at least first pixel—of the first image were deemed to belong to the background, and accordingly, in the first compressed image 11, all pixels are blurred.

The blurred pixel value may be provided in the video compression stream in any arbitrary—e.g. known—feasible manner, such as displayed—e.g. on one or more displays 3 in direct or indirect communication with the background blurring system 1 and/or the video camera 2—and/or e.g. recorded and/or stored digitally for later use. The phrase "providing [ . . . ] pixel value(s) in said video compression stream" may throughout the disclosure refer to "inserting, setting, utilizing and/or using [ . . . ] pixel value(s) in said video compression stream" and/or "storing, saving and/or recording [ . . . ] pixel value(s) for use in said video compression stream", and according to an example further to "providing [ . . . ] pixel value(s) continuously and/or intermittently in said video compression stream" and/or "displaying [ . . . ] pixel value(s)" and/or "utilizing [ . . . ] pixel value(s) in one or more subsequent frames of said video compression stream". The phrase "providing, subsequent said [ . . . ] point in time", on the other hand, may throughout refer to "providing following—and/or essentially at the time of—said [ . . . ] point in time".

The background blurring system 1 is—e.g. by means of a second identifying unit 104—adapted and/or configured for identifying in a second image of the scene, at a subsequent second point in time, that the at least first pixel has altered to be comprised in a foreground of the second image. Thereby, it is established that the one or more pixels previously identified as belonging to a background, in a second image of the scene occurring at an arbitrary second time point are deemed to have altered to belong to a foreground region of the captured second image. According to an example, this may for instance result from one or more persons and/or objects entering the scene.

The second image may refer to any arbitrary image of the scene captured by the video camera 2 subsequent the previously captured first image, and in a similar manner, the second point in time may refer to any arbitrary time point occurring subsequent the first time point, such as a few milliseconds up to minutes or even hours thereafter. It may be noted that the second image not necessarily is an image directly following the first image; on the contrary, an arbitrary number of consecutive images may have been captured between the so called first and second images. Moreover, coming to the conclusion that the at least first pixel is comprised in a foreground of the second image may be determined—and/or have been determined—in any arbitrary—e.g. known—feasible manner, such as by detection of changing or considerably changing pixel value and/or pixel intensity, and/or as previously indicated by commonly known image depth detection. The phrase "pixel has altered to be comprised in a foreground" may refer to "pixel has changed to be comprised in a foreground" and/or "pixel has been determined and/or deemed to have been altered to be comprised in a foreground", whereas "pixel has altered to be comprised in a foreground" may refer to "pixel has altered to be comprised in a determined foreground", "pixel has altered to belong to a foreground" and/or "pixel has altered to be comprised in a foreground region". According to an example, the phrase "pixel has altered to be comprised in a foreground of said second image" may refer to "pixel has altered to be comprised in a dynamic, changing and/or considerably changing region of said second image", "pixel determined and/or deemed to have—and/or having a value that has—altered to be dynamic, changing and/or considerably changing" and/or "pixel determined and/or deemed to currently or essentially currently have—and/or having a value that has—altered to be dynamic, changing and/or considerably changing". Moreover, the term "second image" may refer to "subsequent second image" and/or "second image subsequent said first image".

The background blurring system 1 is—e.g. by means of a second providing unit 105—adapted and/or configured for providing in the video compression stream, subsequent the second point in time—continuously and/or intermittently—identified non-blurred pixel values for the at least first pixel. Thereby, an identified pixel value for the at least first pixel relevant for the second captured image—and further identified changing pixel values thereof in an arbitrary number of subsequent captured images of the scene—are utilized for the video compression stream, such as—as illustrated in FIG. 1*b*—for the corresponding at least first stream pixel 111 displayed in a corresponding second compressed image 12 of said stream. Accordingly, by utilizing non-blurred pixel values—continuously and/or intermittently updated—for the one or more identified foreground pixels in the video compression stream, foreground pixels—such as e.g. one or more moving persons and/or objects—may be in focus as compared to blurred background pixels. In exemplifying FIG. 1*b*, the at least first pixel of the second image was deemed to belong to the foreground, and accordingly, in the second compressed image 12, said pixel(s)—here belonging to an exemplifying moving person—are non-blurred, i.e. distinct. It may be noted that in the illustrated example, the at least first pixel may continuously and/or intermittently change due to said person continuing moving, whereby the non-blurred pixel value for said at least first pixel continuously and/or intermittently may change, such as changing with consecutive captured images of the scene.

The non-blurred pixel values of the at least first pixel may be identified and/or derived in any arbitrary—e.g. known—feasible manner, for instance with support from commonly known image processing. The phrase "providing [ . . . ] identified non-blurred pixel values" may refer to "providing [ . . . ] captured and/or derived non-blurred pixel values", "providing [ . . . ] updated non-blurred pixel values" and/or "providing [ . . . ] updated identified non-blurred pixel values". Moreover, according to an example, the phrase "providing [ . . . ] continuously and/or intermittently identified non-blurred pixel values for said at least first pixel" may refer to "providing [ . . . ] as long as the at least first pixel is comprised in a foreground of consecutive captured images, identified non-blurred pixel values for said at least first pixel". The phrase "non-blurred pixel values", on the other hand, may refer to "actual, detected, focused and/or distinct pixel values".

The background blurring system 1 is—e.g. by means of a third identifying unit 106—adapted and/or configured for identifying in a third image of the scene, at a subsequent third point in time, that the at least first pixel has altered to be comprised in a background of the third image, wherein a value of the at least first pixel has remained unchanged from an intermediate point in time up to the third point in time. Thereby, it is established that the one or more pixels previously identified as belonging to a background followed by being identified as belonging to a foreground, in a third image of the scene occurring at an arbitrary third time point are deemed to have once again—after having been unchanged since an intermediate time point—altered to belong to a background region. According to an example, this may for instance result from one or more persons and/or objects having left the scene and/or being at least partly still.

The third image may refer to any arbitrary image of the scene captured by the video camera 2 subsequent the previously captured second image, and in a similar manner, the third point in time may refer to any arbitrary time point occurring subsequent the second time point, such as a few milliseconds up to minutes or even hours thereafter. It may be noted that the third image not necessarily is an image directly following the second image; on the contrary, an arbitrary number of consecutive images may have been captured between the so called second and third images, for instance in a scenario where the at least first pixel has remained in a foreground for a period of time, e.g. with or without a changing pixel value, such as resulting from the exemplifying moving person. Coming to the conclusion that the at least first pixel at the third point in time then is comprised in a background of the third image may be determined—and/or have been determined—in any arbitrary—e.g. known—feasible manner, such as by detecting, deriving and/or learning that the pixel value of the at least first pixel has remained unchanged—and/or essentially unchanged—e.g. to a predeterminable extent right before the third time point. Here, the at least first pixel is said to have remained unchanged since an exemplifying intermediate time point, which may occur at any arbitrary time point subsequent the second time point, such as a few milliseconds up to minutes or even hours thereafter.

The phrase "pixel has altered to be comprised in a background" may refer to "pixel has again altered to be comprised in a background", "pixel has changed to be comprised in a background" and/or "pixel has been determined and/or deemed to have been altered to be comprised in a background", and further to "pixel has altered to be comprised in a determined background", "pixel altered to belong to a background" and/or "pixel has altered to be comprised in a background region". According to an example, the phrase "pixel has altered to be comprised in a background of said third image" may refer to "pixel has altered to be comprised in a static and/or non-changing region of said third image" and/or "pixel determined and/or deemed to have—and/or having a value that has—altered to be static and/or non-changing and/or having been static and/or non-changing to a predeterminable extent". Moreover, the term "third image" may refer to "subsequent third image" and/or "third image subsequent said second image".

Furthermore, the expression "value of the at least first pixel" may refer to "pixel value of the at least first pixel", whereas "has remained unchanged" may refer to "has remained essentially unchanged", "has reflected non-movement and/or non-motion" and/or "has to a predeterminable extent remained unchanged". The expression "remained unchanged from an intermediate point in time up to said third point in time", on the other hand, may refer to "remained unchanged since an intermediate point in time at least until said third point in time" and/or "remained unchanged from an intermediate point in time, subsequent said second point in time, up to said third point in time".

The background blurring system 1 is—e.g. by means of a third providing unit 107—adapted and/or configured for providing, subsequent the third point in time—when the third point in time is within a predeterminable background merge time period from the intermediate point in time—the blurred pixel value in the video compression stream. Thereby, following said third time point, if the time range from the intermediate time point—i.e. when the at least first pixel last changed its pixel value—to the third time point—i.e. when the at least first pixel altered from being a foreground pixel to again become a background pixel—is within a set time period, then the previously determined blurred pixel value for the at least first pixel is re-used in the video compression stream, such as—as illustrated in FIG. 1c—for the corresponding at least first stream pixel 111 displayed in a corresponding third compressed image 13 of said stream. That is, if the at least first pixel alters from being a non-changing foreground pixel to then once again become a background pixel within a predeterminable time period—which for instance may be exemplified by one or more persons and/or objects passing though the scene within said background merge time period e.g. set to exemplifying five second and/or never standing still for more than the background merge time period—then the already determined blurred pixel value—which was determined following the first time point i.e. when the at least first pixel was previously identified as a background pixel—is again used in the video compression stream. Thus, by re-using the already determined blurred pixel value—which may be considered still valid when the background merge time period criterion is met—it is deemed unnecessary to determine an updated blurred pixel value for the at least first pixel, and accordingly, reduced computational cost and/or efficient bitrate compression of the video compression stream is provided. Moreover, since the amount of compute then needed is reduced, a relatively large image filter kernel—e.g. represented by a blur kernel—may be utilized. In exemplifying FIG. 1c, the at least first pixel of the third image was deemed to once again belong to the background, and since this altering—according to this example—occurred within the set background merge time period, in the third compressed image 13 said pixel(s) is blurred using the previously determined blurred value(s).

The background merge time period may be of any arbitrary feasible time range, such as a fixed time range, for instance being less than a second, up to tens of seconds, or even up to several minutes or hours. According to a one example, the background merge time period is greater than two seconds, according to another example greater than five seconds, and according to yet another example greater than ten seconds. Similarly, according to an example, the background merge time period is less than sixty seconds, according to another example less than thirty seconds, and according to yet another example less than ten seconds Said background merge time period may further be variable and/or adjustable, and for instance set as deemed suitable for the implementation and/or situation at hand. The phrase "when said third time point is within a predeterminable background merge time period from said intermediate point in time" may refer to "if, should and/or provided that said third time point is within a predeterminable background merge time period from said intermediate point in time", whereas "predeterminable background merge time period" may refer to "predetermined background merge time period" and/or merely "background merge time period". Moreover, the phrase "background merge time period" may refer to "first time period", "re-use threshold time period" and/or "background merge time range". According to an example, the phrase "providing, subsequent said third point in time, said blurred pixel value in said video compression stream" may refer to "re-utilizing, subsequent said third point in time, said blurred pixel value in one or more subsequent frames of said video compression stream".

Optionally, the background blurring system 1 may—e.g. by means of an optional second blurring unit 108—be adapted and/or configured for, when the third point in time not is within the background merge time period, determining an updated blurred pixel value for the at least first pixel. Thereby, if the time range from the intermediate time point—i.e. from when a value of the at least first pixel has remained unchanged—to the third time point—i.e. to when the at least first pixel altered from being a foreground pixel to again become a background pixel—not is within the set time period, then an updated blurred value may be established for the at least first pixel. That is, should the background merge time period criterion not be met, then determining an updated blurred pixel value for the at least first pixel is deemed due, in that the previously determined blurred pixel value(s) is deemed no longer relevant since the at least first pixel then is considered to reflect a different, new and/or updated background as compared to the previously determined blurred pixel value(s). The phrase "when said third time point not is within said background merge time period" may refer to "if, should and/or provided that said third time point not is within said background merge time period", whereas "updated blurred pixel value" may refer to "new blurred pixel value".

Further optionally, the background blurring system 1 may then—e.g. by means of an optional fourth providing unit 109—be adapted and/or configured for providing, subsequent the third point in time, the updated blurred pixel value in the video compression stream. Thereby, following said third time point, if the time range from the intermediate time point—i.e. from when a value of the at least first pixel has remained unchanged—to the third time point—i.e. when the at least first pixel altered from being a foreground pixel to again become a background pixel—not is within the set time period as discussed above, then the updated determined blurred pixel value for the at least first pixel is used in the video compression stream, such as—as illustrated in FIG. 1*e*—for the corresponding at least first stream pixel 111 displayed in a corresponding alternative third compressed image 13' of said stream. That is, if the time ranging from when the at least first pixel becomes a non-changing foreground pixel to then once again become a background pixel not is within the set time period—which for instance may be exemplified by e.g. an object such as a person having entered the scene to then at least partly standing still as exemplified in FIG. 1*d*—then the determined updated blurred pixel value may be used in the video compression stream, rather than the previously determined blurred pixel value which now is— and/or is deemed to be—obsolete. In exemplifying FIG. 1*e*, the at least first pixel was deemed to once again belong to the background, and since this altering—according to this example which as mentioned above may be illustrated by e.g. a person having entered the scene to then at least partly standing still for longer than the set background merge time period, in the alternative third compressed image 13' said pixel(s) are once again blurred, now with the updated determined blurred pixel value(s).

Moreover, optionally, the background blurring system 1 may further—e.g. by means of the optional second blurring unit 108—be adapted and/or configured for additionally determining updated blurred pixel values for additional pixels near the at least first pixel. The background blurring system 1 may then further—e.g. by means of the optional fourth providing unit 109—be adapted and/or configured for additionally providing the updated blurred pixel values for the additional pixels. Thereby, following the previously discussed third time point, in addition to determining and subsequently providing—in the video compression stream—an updated blurred pixel value for the at least first pixel, updated pixel values are determined and subsequently provided also for a predeterminable portion of pixels in vicinity of and/or associated with the at least first pixel.

The additional pixels near the at least first pixel for which updated blurred pixel values additionally may be determined, may be represented by any feasible arbitrarily dimensioned portion of pixels and/or number of pixels near the at least first pixel, such as pixels adjacent said at least first pixel. Said additional pixels may according to an example be represented by pixels forming a rectangle or quadrat—for instance 10*10 pixels—surrounding the at least first pixel. It may be noted that the at least first pixel then not necessarily needs to be centered in said rectangle or quadrat. According to a further example, said additional pixels may be represented by pixels identified to be part of and/or associated with an object which the at least first pixel belong to. The phrase "for additional pixels near said at least first pixel" may refer to "for additional pixels surrounding and/or adjacent to said at least first pixel" and/or "for a portion of additional pixels near said at least first pixel".

Optionally, the background blurring system 1 may—e.g. by means of an optional supplemental blurring unit 110—be adapted and/or configured for—when the blurred pixel value at a predeterminable supplemental point in time—is determined to not have been updated for a predeterminable supplemental time period, determining from a current image of the scene, an updated blurred pixel value for the at least first pixel. The background blurring system 1 may then further—e.g. by means of an optional supplemental providing unit 111—be adapted and/or configured for providing, subsequent the supplemental point in time, the updated blurred pixel value in the video compression stream. Thereby, following said supplemental time point, if the blurred pixel value at an arbitrary time point is determined not to have been updated for a set time period, then an updated blurred pixel value is determined for the at least first pixel from a current image and subsequently used in the video compression stream. Accordingly, should the at least first pixel remain a background pixel for the set supplemental time period, then an updated blurred pixel value may nonetheless be determined and provided in the video compression stream. Thereby, situations e.g. involving provision of previously determined blurred pixel values—which potentially may have become obsolete and/or erroneous—may be compensated for. In a similar manner, situations e.g. involving slowly changing light conditions such as during dusk or dawn—which not necessarily causes the at least first pixel to alter from being background to foreground—may additionally or alternatively be compensated for.

The supplemental time period may be of any arbitrary feasible time range, for instance ranging from less than a second up to tens of seconds, or even up to several minutes or hours According to an example, the supplemental time period may be represented by a time range equal to or essentially equal to the time range of the previously discussed background merge time period. Said supplemental time period may further be variable and/or adjustable, and for instance set as deemed suitable for the implementation and/or situation at hand. In a similar manner, the supplemental point in time may be any arbitrary feasible time point. According to an example, said supplemental point in time may be represented by a time point occurring a time range equal to or essentially equal to a background merge time period after the previously discussed supplemental point in time. It may be noted that the supplemental time period and/or a magnitude thereof may differ with different pixels. The phrase "when said blurred pixel value at a predeterminable supplemental point in time" may refer to "if, should and/or provided that said blurred pixel value at a predeterminable supplemental point in". The phrase "predeterminable supplemental point in time", on the other hand, may refer to "predetermined supplemental point in time" and/or merely "supplemental point in time", whereas "predeterminable supplemental time period" may refer to "predetermined supplemental time period" and/or merely "supplemental time period". Moreover, the phrase "from a current image of said scene" may refer to "from an essentially current and/or upcoming image of said scene".

Optionally, the background blurring system 1 may—e.g. by means of an optional I-frame blurring unit 112—be adapted and/or configured for, when a predeterminable forthcoming frame of the video compression stream—at a predeterminable I-frame related point in time—is an I-frame, determining updated blurred pixel values for the at least first pixel and further pixels of a predeterminable portion out of pixels identified to be comprised in a background of a current image of the scene. The background blurring system 1 may then further—e.g. by means of an optional I-frame providing unit 113—be adapted and/or configured for providing, subsequent the I-frame related point in time, the updated blurred pixel values in the video compression stream. Thereby, following said I-frame related time point, if a predeterminable forthcoming frame of the video compression stream is an I-frame, then updated blurred pixel values may be determined from a current image for the at least first pixel and additionally for a selected portion of pixels out of background pixels, and subsequently used in the video compression stream. Accordingly, for one or more selected I-frames, a range of selected background pixels—including the at least first pixel—may be updated. Thereby, updated blurred pixel values may be determined and provided for a selection of pixels—which pixel selection may vary from one selected I-frame to another—without having a negative effect on the computational cost and/or the video compression stream bitrate.

The predeterminable I-frame related point in time may be represented by any arbitrary feasible time point, and similarly, the predeterminable forthcoming I-frame may refer to any arbitrary feasible I-frame of the video compression stream. For instance, every $n^{th}$ I-frame may be a selected—i.e. predeterminable—I-frame, where n may be arbitrarily selected as deemed suitable for the implementation and/or situation at hand. The phrase "when a predeterminable forthcoming frame of said video compression stream [ . . . ] is an I-frame" may refer to "if, should and/or provided that a predeterminable forthcoming frame of said video compression stream [ . . . ] is an I-frame", whereas "forthcoming frame" may refer to "upcoming frame" and/or "next-coming frame". The phrase "predeterminable forthcoming frame", on the other hand, may refer to "predetermined forthcoming frame" and/or "selected forthcoming frame", whereas "predeterminable I-frame related point in time", on the other hand, may refer to "predetermined I-frame related point in time" and/or merely "I-frame related point in time". Moreover, the phrase "further pixels of a predeterminable portion" may refer to "additional pixels of a predeterminable portion", "further pixels of a predetermined portion" and/or merely "further pixels of a portion", whereas the phrase "portion out of pixels identified to be comprised in a background" may refer to "range, set and/or selection out of pixels identified to be comprised in a background". Furthermore, the phrase "of a current image of said scene" may refer to "of an essentially current and/or upcoming image of said scene".

As further shown in FIG. 2, the background blurring system 1 may comprise a first identifying unit 101, a first blurring unit 102, a first providing unit 103, a second identifying unit 104, a second providing unit 105, a third identifying unit 106, a third providing unit 107, an optional second blurring unit 108, an optional fourth providing unit 109, an optional supplemental blurring unit 110, an optional supplemental providing unit 111, an optional I-frame blurring unit 112 and an optional I-frame providing unit 113, all of which already have been described in greater detail above. Furthermore, the embodiments herein for provision of a video compression stream from a video camera 2 adapted for capturing a scene, may be implemented through one or more processors, such as a processor 114 for instance a graphics processing unit, GPU, and/or a central processing unit, CPU, together with computer program code for performing the functions and actions of the embodiments herein. Said program code may also be provided as a computer program product, for instance in the form of a data carrier carrying computer program code for performing the embodiments herein when being loaded into the background blurring system 1. One such carrier may be in the form of a CD ROM disc, optical disc, solid state disk, flash memory and/or a hard drive, it is however feasible with other data carriers. The computer program code may furthermore be provided as pure program code on a server and downloaded to the background blurring system 1. The background blurring system 1 may further comprise a memory 115 comprising one or more memory units. The memory 115 may be arranged to be used to store e.g. information, and further to store data, configurations, schedulings, and applications, to perform the methods herein when being executed in the background blurring system 1. For instance, the computer program code may be implemented in the firmware, stored in FLASH memory 115, of an embedded processor 114. Furthermore, said units 101-113, the optional processor 114 and/or the optional memory 115 may at least partly be comprised in, associated with and/or be connected to the video camera 2 and/or for instance a surveillance system optionally comprising said video camera 2. Those skilled in the art will also appreciate that said units 101-113 described above may refer to a combination of analog and digital circuits, and/or one or more processors configured with software and/or firmware, e.g. stored in a memory such as the memory 115, that when executed by the one or more processors such as the processor 114 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, Soc.

Figure 3:
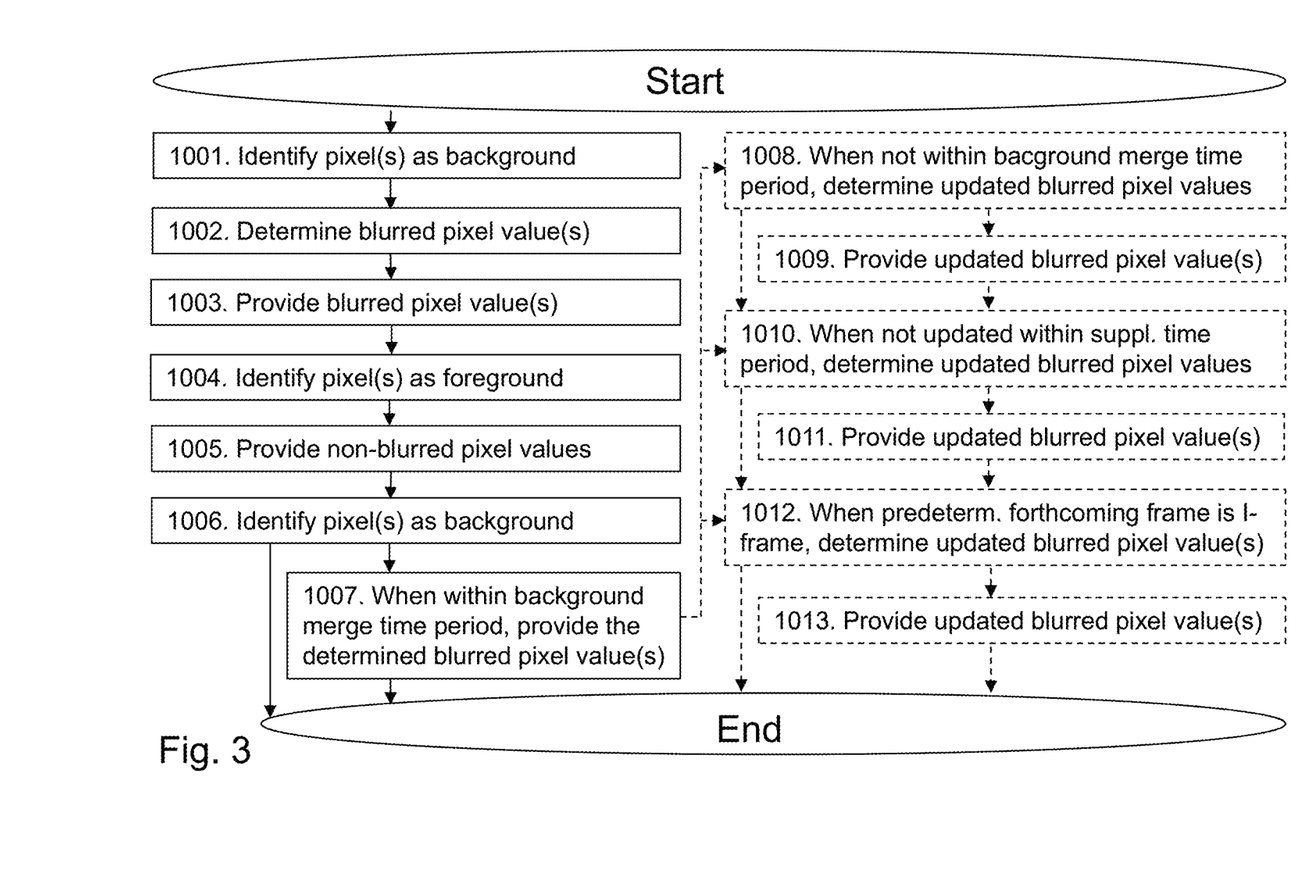
FIG. 3 is a flowchart depicting an exemplifying method performed by a background blurring system according to embodiments of the disclosure.

FIG. 3 is a flowchart depicting an exemplifying method performed by a background blurring system 1 according to embodiments of the disclosure. Said method is for provision of a video compression stream from a video camera 2 adapted for capturing a scene. The exemplifying method, which may be continuously repeated, comprises one or more of the following actions discussed with support from FIGS. 1-2. Moreover, the actions may be taken in any suitable order and/or one or more actions may be performed simultaneously and/or in alternate order where applicable. For instance, optional actions 1010 and 1011, and/or actions 1012 and 1013, may be performed prior to actions 1008 and 1009.

Action 1001

In Action 1001, the background blurring system 1 identifies in a first image of the scene, at a first point in time—e.g. with support from the first identifying unit 101—at least a first pixel comprised in a background of the first image.

Action 1002

In Action 1002, the background blurring system 1 determines—e.g. with support from the first blurring unit 102—a blurred pixel value for the at least first pixel.

Action 1003

In Action 1003, the background blurring system 1 provides subsequent the first point in time—e.g. with support from the first providing unit 103—the blurred pixel value in the video compression stream.

Action 1004

In Action 1004, the background blurring system 1 identifies in a second image of the scene, at a subsequent second point in time—e.g. with support from the second identifying unit 104—that the at least first pixel has altered to be comprised in a foreground of the second image.

Action 1005

In Action 1005, the background blurring system 1 provides in the video compression stream continuously and/or intermittently, subsequent the second point in time—e.g. with support from the second providing unit 105—identified non-blurred pixel values for the at least first pixel.

Action 1006

In Action 1006, the background blurring system 1 identifies in a third image of the scene, at a subsequent third point in time—e.g. with support from the third identifying unit 106—that the at least first pixel has altered to be comprised in a background of the third image, wherein a value of the at least first pixel has remained unchanged from an intermediate point in time up to the third point in time.

Action 1007

In Action 1007, when the third point in time is within a predeterminable background merge time period from the intermediate point in time, the background blurring system 1 provides, subsequent the third point in time—e.g. with support from the third providing unit 107—the blurred pixel value in the video compression stream.

Action 1008

In optional Action 1008, when the third point in time not is within the background merge time period, the background blurring system 1 may determine—e.g. with support from the optional second blurring unit 108—an updated blurred pixel value for the at least first pixel.

Optionally, the determining of Action 1008 may comprise additionally determining updated blurred pixel values for additional pixels near the at least first pixel.

Action 1009

In optional Action 1009, which may follow upon optional action 1008, when the third point in time not is within the background merge time period, the background blurring system 1 may then provide, subsequent the third point in time—e.g. with support from the optional fourth providing unit 109—the updated blurred pixel value in the video compression stream.

Optionally, the providing of Action 1009 may comprise additionally providing the updated blurred pixel values for the additional pixels.

Action 1010

In optional Action 1010, when the blurred pixel value at a predeterminable supplemental point in time is determined to not have been updated for a predeterminable supplemental time period, the background blurring system 1 may determine, from a current image of the scene—e.g. with support from the optional supplemental blurring unit 110—an updated blurred pixel value for the at least first pixel.

Action 1011

In optional Action 1011, which may follow upon optional action 1010, when the blurred pixel value at the predeterminable supplemental point in time is determined to not have been updated for a predeterminable supplemental time period, the background blurring system 1 may then provide, subsequent the supplemental point in time—e.g. with support from the optional supplemental providing unit 111—the updated blurred pixel value in the video compression stream.

Action 1012

In optional Action 1012, when a predeterminable forthcoming frame of the video compression stream, at a predeterminable I-frame related point in time, is an I-frame, the background blurring system 1 may determine—e.g. with support from the optional I-frame blurring unit 112—updated blurred pixel values for the at least first pixel and further pixels of a predeterminable portion out of pixels identified to be comprised in a background of a current image of the scene.

Action 1013

In optional Action 1013, which may follow upon optional action 1012, when the predeterminable forthcoming frame of the video compression stream, at the predeterminable I-frame related point in time, is an I-frame, the background blurring system 1 may then provide, subsequent the I-frame related point in time—e.g. with support from the optional I-frame providing unit 113—the updated blurred pixel values in the video compression stream.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a background blurring system for provision of a video compression stream from a video camera adapted for capturing a scene, said method comprising:
- identifying in a first image of said scene, at a first point in time, at least a first pixel comprised in a background of said first image;
- determining a blurred pixel value for said at least first pixel;
- providing, subsequent said first point in time, said blurred pixel value in said video compression stream;
- identifying in a second image of said scene, at a subsequent second point in time, that said at least first pixel has altered to be comprised in a foreground of said second image;
- providing in said video compression stream, subsequent said second point in time—continuously and/or intermittently—identified non-blurred pixel values for said at least first pixel;
- identifying in a third image of said scene, at a subsequent third point in time when the at least first pixel altered from being a foreground pixel to again become a background pixel, that said at least first pixel has altered to be comprised in a background of said third image; and
- when said third point in time is within a predeterminable background merge time period from an intermediate point in time subsequent said second point in time, from which a value of said at least first pixel has remained unchanged:
- providing, subsequent said third point in time, said blurred pixel value in said video compression stream.

2. The method according to claim 1, said method further comprising:
- under a condition said third point in time is not within said background merge time period:
- determining an updated blurred pixel value for said at least first pixel; and
- providing, subsequent said third point in time, said updated blurred pixel value in said video compression stream.

3. The method according to claim 2, wherein said determining an updated blurred pixel value comprises additionally determining updated blurred pixel values for additional pixels near said at least first pixel, and wherein said providing said updated blurred pixel value comprises additionally providing said updated blurred pixel values for said additional pixels.

4. The method according to claim 1, said method further comprising:
- when said blurred pixel value at a predeterminable supplemental point in time is determined to not have been updated for a predeterminable supplemental time period:
- determining from a current image of said scene, an updated blurred pixel value for said at least first pixel; and
- providing, subsequent said supplemental point in time, said updated blurred pixel value in said video compression stream.

5. The method according to claim 1, said method further comprising:
- when a predeterminable forthcoming frame of said video compression stream, at a predeterminable I-frame related point in time, is an I-frame:
- determining, for said at least first pixel and further pixels of a predeterminable portion out of pixels identified to be comprised in a background of a current image of said scene, updated blurred pixel values; and
- providing, subsequent said I-frame related point in time, said updated blurred pixel values in said video compression stream.

6. The method according to claim 1, wherein a kernel size of an image filter kernel used for determining blurred pixel values of said at least first pixel, aligns with a macro block size of an I-frame of said video compression stream.

7. A non-transitory computer program product comprising a computer program containing computer program code that when executed by a computer or a processor causes the computer or the processor to execute steps of the method according to claim 1.

8. A background blurring system for provision of a video compression stream from a video camera adapted for capturing a scene, said background blurring system comprising:
- a first identifying unit for identifying in a first image of said scene, at a first point in time, at least a first pixel comprised in a background of said first image;
- a first blurring unit for determining a blurred pixel value for said at least first pixel;
- a first providing unit for providing, subsequent said first point in time, said blurred pixel value in said video compression stream;
- a second identifying unit for identifying in a second image of said scene, at a subsequent second point in time, that said at least first pixel has altered to be comprised in a foreground of said second image;
- a second providing unit for providing in said video compression stream, subsequent said second point in time—continuously and/or intermittently—identified non-blurred pixel values for said at least first pixel;
- a third identifying unit for identifying in a third image of said scene, at a subsequent third point in time when the at least first pixel altered from being a foreground pixel to again become a background pixel, that said at least first pixel has altered to be comprised in a background of said third image; and
- a third providing unit for, when said third point in time is within a predeterminable background merge time period from an intermediate point in time subsequent said second point in time, from which a value of said at least first pixel has remained unchanged, providing, subsequent said third point in time, said blurred pixel value in said video compression stream.

9. The background blurring system according to claim 8, further comprising:
- a second blurring unit for, when said third point in time is not within said background merge time period, determining an updated blurred pixel value for said at least first pixel; and
- a fourth providing unit for providing, subsequent said third point in time, said updated blurred pixel value in said video compression stream.

10. The background blurring system according to claim 9, wherein said second blurring unit is adapted for additionally determining updated blurred pixel values for additional pixels near said at least first pixel, and wherein said fourth providing unit is adapted for additionally providing said updated blurred pixel values for said additional pixels.

11. The background blurring system according to claim 8, further comprising:
- a supplemental blurring unit for, when said blurred pixel value at a predeterminable supplemental point in time is determined to not have been updated for a predeterminable supplemental time period, determining from a current image of said scene, an updated blurred pixel value for said at least first pixel; and a supplemental providing unit for providing, subsequent said supplemental point in time, said updated blurred pixel value in said video compression stream.

12. The background blurring system according to claim 8, further comprising:

an I-frame blurring unit for, when a predeterminable forthcoming frame of said video compression stream, at a predeterminable I-frame related point in time, is an I-frame, determining for said at least first pixel and further pixels of a predeterminable portion out of pixels identified to be comprised in a background of a current image of said scene, updated blurred pixel values; and an I-frame providing unit for providing, subsequent said I-frame related point in time, said updated blurred pixel values in said video compression stream.

13. The background blurring system according to claims 8, wherein a kernel size of an image filter kernel used for determining blurred pixel values of said at least first pixel, aligns with a macro block size of an I-frame of said video compression stream.

14. A video camera comprising a background blurring system according to claim 8.

15. A background blurring system for provision of a video compression stream from a video camera adapted for capturing a scene, said background blurring system comprising:

circuitry configured to identify a first image of said scene, at a first point in time, at least a first pixel comprised in a background of said first image;

determine a blurred pixel value for said at least first pixel;

provide, subsequent to said first point in time, said blurred pixel value in said video compression stream;

identify in a second image of said scene, at a subsequent second point in time, that said at least first pixel has altered to be comprised in a foreground of said second image;

provide in said video compression stream, subsequent to said second point in time, identified non-blurred pixel values for said at least first pixel;

identify in a third image of said scene, at a subsequent third point in time when the at least first pixel altered from being a foreground pixel to again become a background pixel, that said at least first pixel has altered to be comprised in a background of said third image; and in response to said third point in time being within a predeterminable background merge time period from an intermediate point in time subsequent said second point in time, from which a value of said at least first pixel has remained unchanged, provide, subsequent to said third point in time, said blurred pixel value in said video compression stream.

* * * * *